United States Patent

Yamana

[19]

[11] Patent Number: 6,067,109
[45] Date of Patent: May 23, 2000

[54] IMAGE READING METHOD

[75] Inventor: Keiichi Yamana, Kanagawa, Japan

[73] Assignee: Fuji Photo Film Co., Ltd., Kanagawa, Japan

[21] Appl. No.: 08/671,075

[22] Filed: Jun. 27, 1996

Related U.S. Application Data

[63] Continuation of application No. 08/172,072, Dec. 23, 1993.

[30] Foreign Application Priority Data

Dec. 25, 1992 [JP] Japan .................................. 4-346954

[51] Int. Cl.⁷ .............................. H04N 1/40; H04N 1/70
[52] U.S. Cl. ............................... 348/104; 348/96; 348/97
[58] Field of Search ..................... 348/101, 102, 348/104, 96, 97, 112, 110, 107

[56] References Cited

U.S. PATENT DOCUMENTS

| | | | |
|---|---|---|---|
| 4,893,178 | 1/1990 | Matama et al. ............................ | 358/76 |
| 4,974,068 | 11/1990 | Hiramatsu et al. ...................... | 348/104 |
| 5,003,379 | 3/1991 | Moore, Jr. et al. ..................... | 348/104 |
| 5,041,866 | 8/1991 | Imoto ..................................... | 348/107 |
| 5,049,984 | 9/1991 | Moore, Jr. et al. ..................... | 348/104 |
| 5,060,061 | 10/1991 | Shishido et al. ........................ | 348/104 |
| 5,099,359 | 3/1992 | Hrycin et al. ........................... | 348/104 |
| 5,153,715 | 10/1992 | Bender et al. .......................... | 348/104 |
| 5,164,726 | 11/1992 | Bernstein et al. ...................... | 348/104 |
| 5,165,068 | 11/1992 | Baldwin .................................. | 348/104 |
| 5,166,783 | 11/1992 | Hodgson ................................ | 348/104 |
| 5,210,600 | 5/1993 | Hirata ...................................... | 358/76 |
| 5,231,515 | 7/1993 | Endo ....................................... | 348/110 |
| 5,237,431 | 8/1993 | Imoto ..................................... | 348/445 |
| 5,241,376 | 8/1993 | Takanashi et al. ..................... | 348/104 |
| 5,255,083 | 10/1993 | Capitant et al. ........................ | 348/104 |
| 5,321,500 | 6/1994 | Capitant et al. ........................ | 348/104 |
| 5,512,948 | 4/1996 | Iwamatsu ............................... | 348/255 |
| 5,751,451 | 5/1998 | Ogoshi et al. .......................... | 358/527 |

*Primary Examiner*—Anand S. Rao
*Attorney, Agent, or Firm*—Sughrue, Mion, Zinn, Macpeak & Seas, PLLC

[57] ABSTRACT

An image reading method which can achieve highly accurate image reading with no color balance lost regardless of the type of recording media, that is, whether a film is a negative film or a reversal film, and thus is able to obtain in a stable manner a reproduced image of higher quality having excellent color balance and density balance. A reading light beam is irradiated on a transparent-type original, the transmitted light of the transparent-type original is separated into the three primary colors and is read by means of an photoelectric transducer device. If the transparent-type original is a negative film, then the adjustments of the transmitted light reading by the photoelectric transducer device are made respectively in the three primary colors independently of one another and, if the transparent-type original is a reversal film, then the adjustments of the transmitted light reading by the photoelectric transducer device are made uniformly in all of the three primary colors.

8 Claims, 7 Drawing Sheets

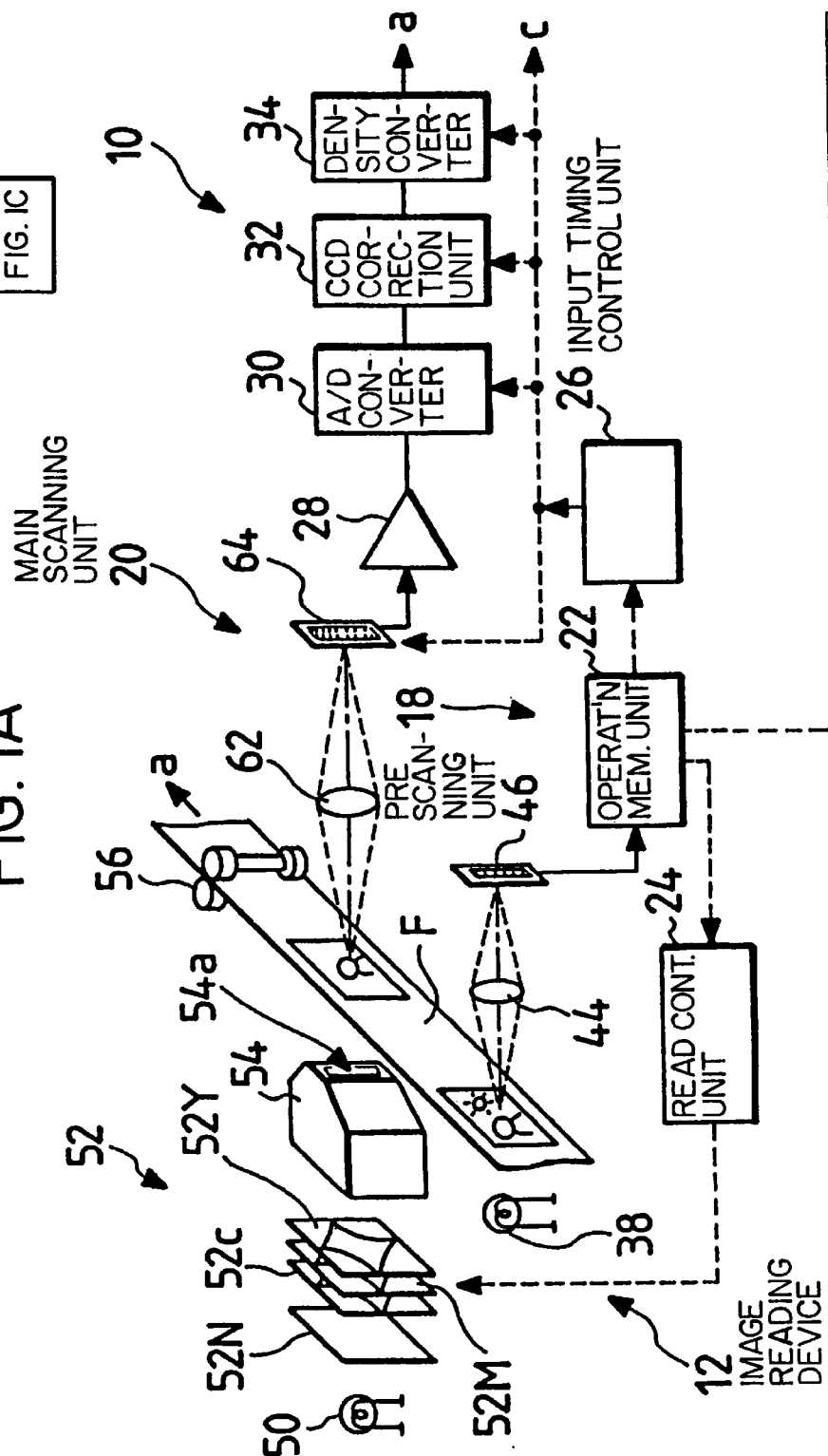

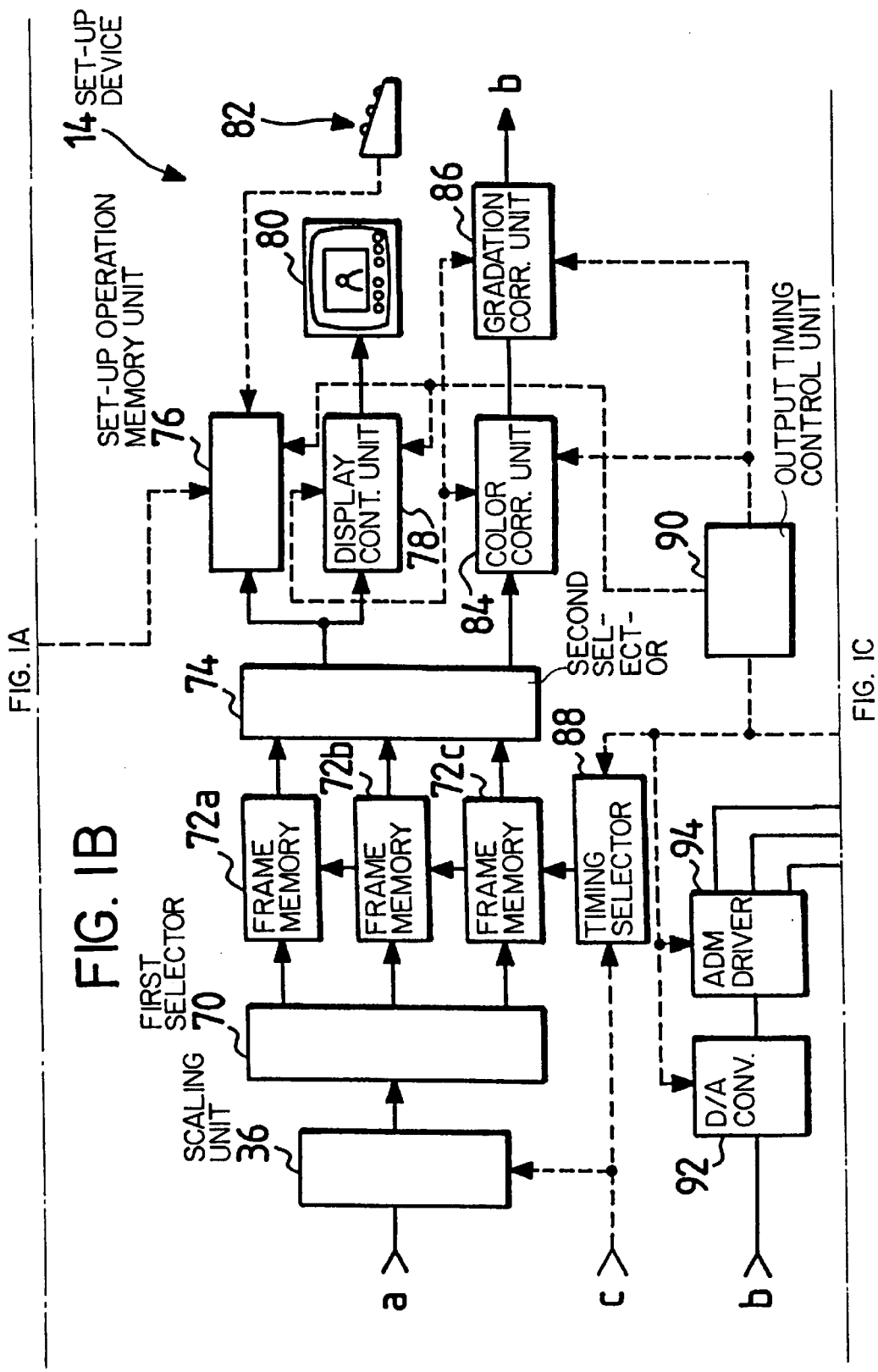

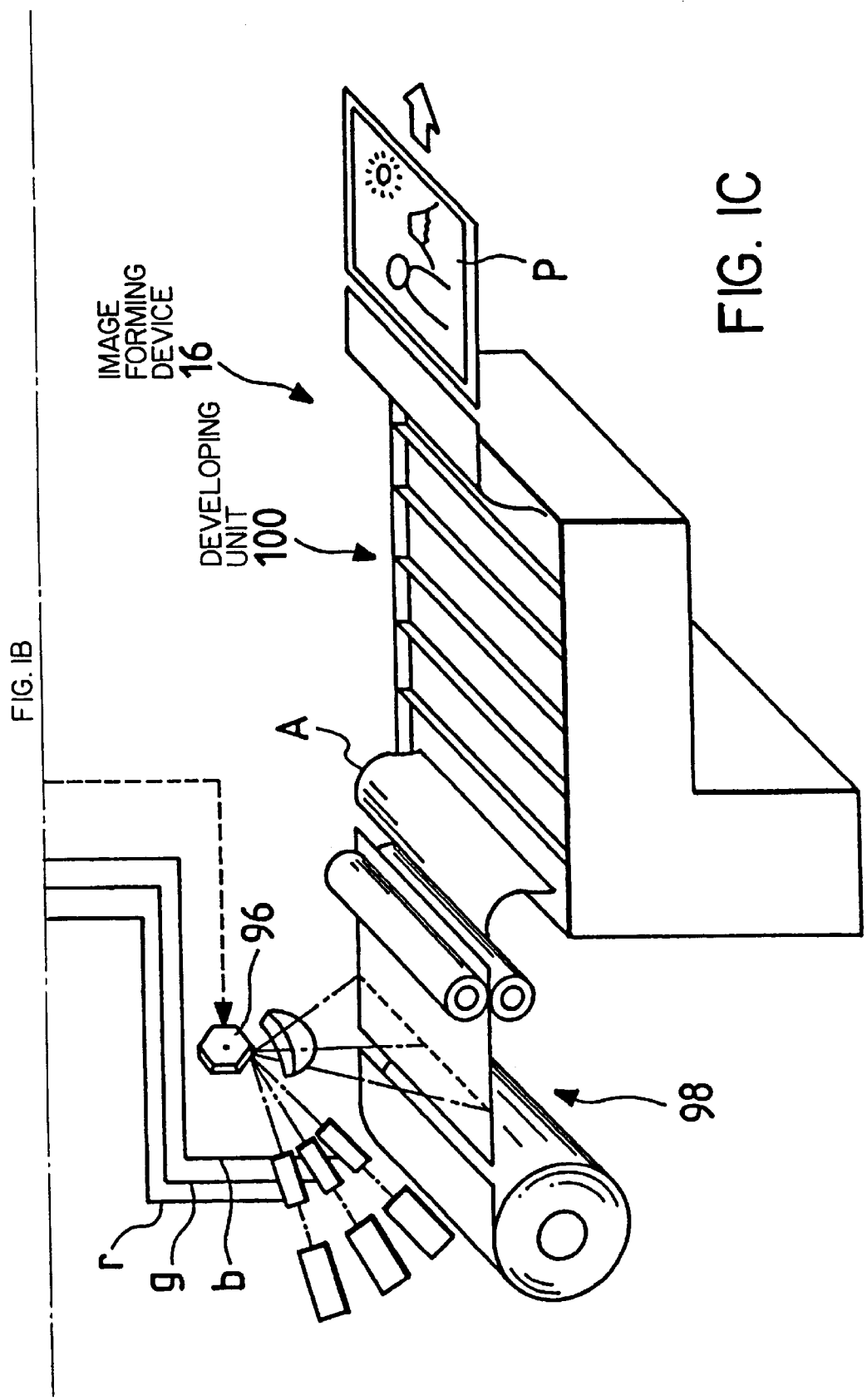

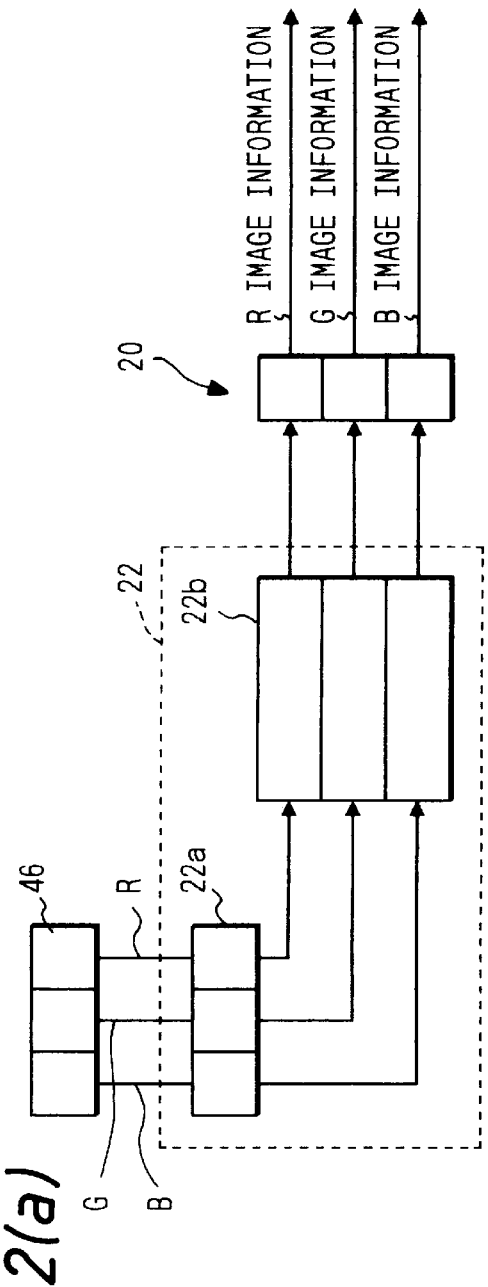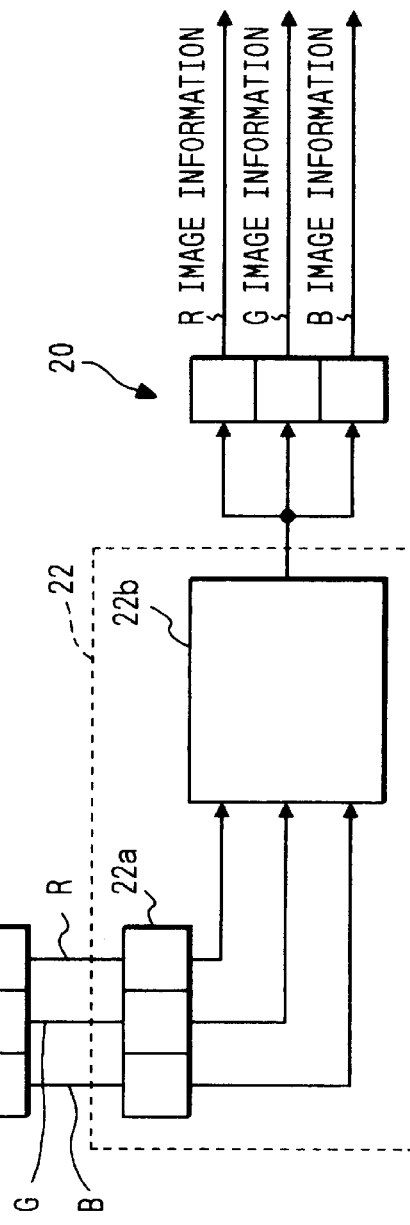
FIG. 2(a)
FIG. 2(b)

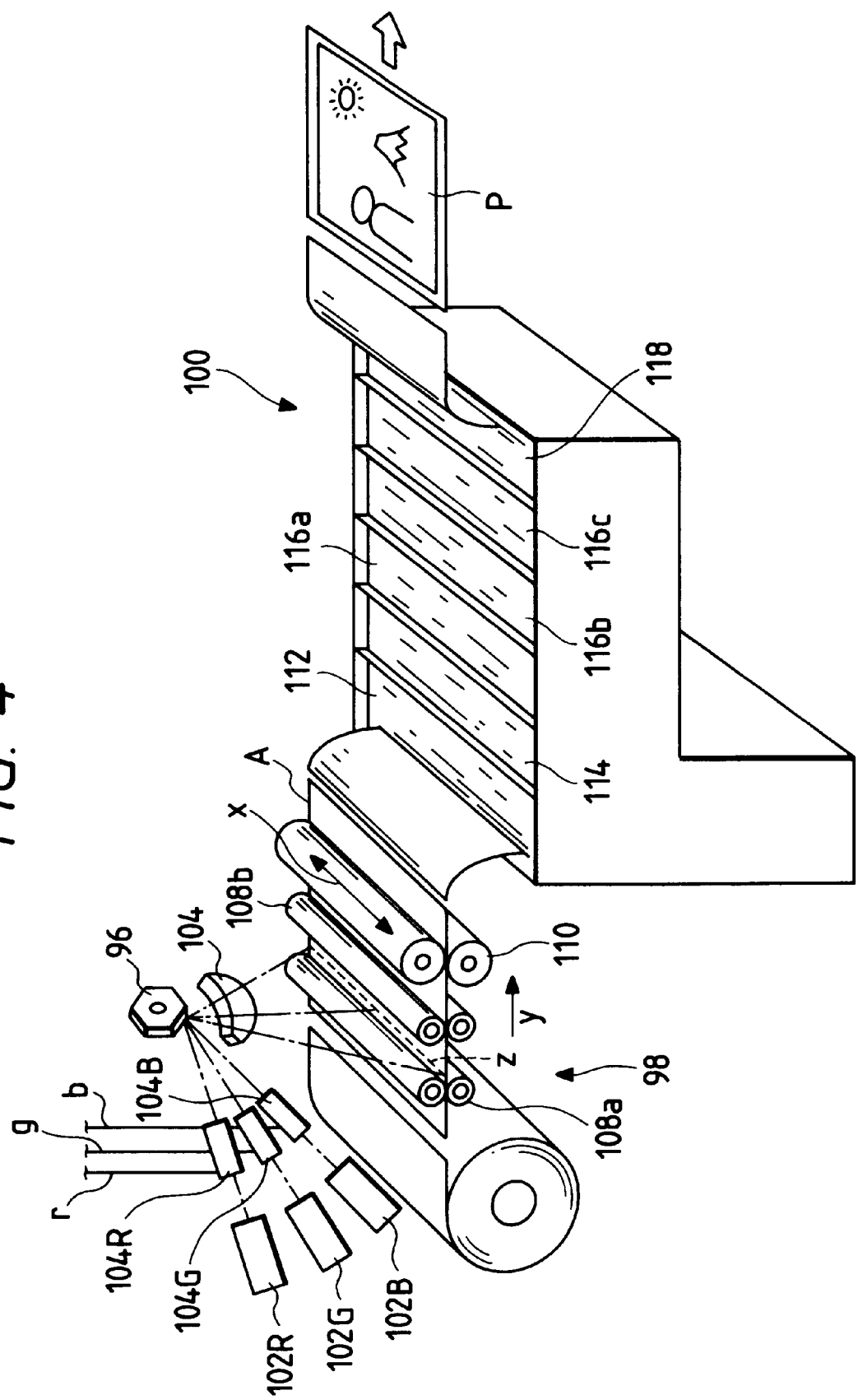

IMAGE READING METHOD

This is a Continuation of application Ser. No. 08/172,072, filed Dec. 23, 1993.

BACKGROUND OF THE INVENTION

The present invention relates to an image reading method for reading images recorded on a transparent-type original such as a negative film, a reversal film or the like. In particular, the present invention relates to an image reading method which is able to read images with high accuracy to thereby obtain reproduced images of high quality regardless of whether the transparent-type originals is a negative film or a reversal film.

In recent years, there has been developed a digital photoprinter which reads photoelectrically image information recorded on a photographic film such as negative film, a reversal film or the like, converts the read images into digital signals, performs various image processing operations on the digital signals to thereby provide image information for recording, and scans and exposes a photosensitive material such as photographic paper or the like by means of a recording light modulated according to the image information to thereby provide a print.

The digital photoprinter is able to carry out freely editing and layout operations on print images such as synthesis of a plurality of images, division of an image or the like, editing of characters and images, and other similar editing, and is also able to perform various image processing operations such as color/density adjustment, scaling, outline emphasis and the like. That is, the digital photoprinter is able to freely edit images and perform processing on the images according to their uses to thereby provide a finished print.

In a print obtained by a conventional a real exposure, in terms of density resolution, spatial resolution, color/density reproduction and the like, all of the image information recorded on the film cannot be reproduced. On the other hand, in a digital photoprinter, it is possible to output a print in which almost 100% of image density information recorded on a film is reproduced.

The digital photoprinter includes as basic components a reading device for reading images recorded on an original such as a film or the like, a set-up device for performing processing on the read images and determining exposure conditions in the following step, and an image forming device for scanning and exposing a photosensitive material in accordance with the determined exposure conditions to thereby perform development processing on the photosensitive material.

In an image reading device that reads images recorded on a film or the like, for example, in the case of reading according to slit scanning, a slit-like reading light beam extending in a one-dimensional direction is radiated onto the film and, at the same time, the film is moved in a direction substantially perpendicularly intersecting the above-mentioned one-dimensional direction (or the reading light and photoelectric transducer device are moved), whereby the film is scanned by use of the reading light in a two-dimensional manner.

The transmitted light carrying the film image that has passed through the film is formed into an image on the light receiving surface of a photoelectric transducer device such as a CCD line sensor or the like, converted photoelectrically, and then further processed as the situation requires.

The light quantity data that is read is then amplified and A/D converted into a digital signal. Subsequently, the digital signal undergoes various image processing operations such as correction of characteristic variations by the respective CCD elements, density change, scaling and the like. Next, the digital signal is transferred to the set-up device.

The set-up device reproduces the image information transferred thereto on a display such as a CRT or the like as a visible image.

On viewing the reproduced image, an operator performs further additional correction processing operations such as gradation correction processing, color/density correction processing and the like on the reproduced image (setting of the set-up conditions) and, if the operator judges that the reproduced image is satisfactory as a finished print, then the reproduced image is transferred to the image forming device as the image information for recording.

In this image forming device, if the image information requires the use of image recording by means of raster scanning (light beam scanning), then three light beams respectively corresponding to three primary color photosensitive layers formed in a photosensitive material, for example, corresponding to R(red), G(green), and B(blue) exposures, are respectively modulated according to the image information for recording, so that they are deflected in a main scan direction (which corresponds to the above-mentioned one-dimensional direction). Also, by sub-scanning and carrying the photosensitive material in a direction substantially perpendicularly intersecting the main scan direction (by sub-scanning the deflected light beams and photosensitive material relatively to each other), the photosensitive material is scanned and exposed in a two-dimensional manner by the light beams modulated according to the recording images, so that the film image is recorded on the photosensitive material.

Subsequently, the exposed photosensitive material undergoes developing processing according to the type of the photosensitive material, for example, if it is a silver salt photographic photosensitive material, then a developing processing comprising color development, bleach-fix, washing, drying and the like are performed on the silver salt photosensitive material, and then it is output as a finished print.

As is known well, a film is not always exposed to a proper quantity of light, and sometimes suffers from various exposures, for example, it may be underexposed or overexposed. Referring to an image density $D(=\log E)$ recorded on a normal negative film, the maximum density thereof is of the order of 2.8–3.2, whereas the maximum density of an image to be recorded on a normal reversal film reaches the order of 3.2–3.8.

In order to obtain a finished print of high quality in a digital photoprinter, it is necessary to use a photoelectric transducer device which has not only a higher spatial resolution but also a higher density (quantity of light) resolution, for example, it is preferred to use a CCD or the like. However, in general, a photoelectric transducer having both higher spatial and density resolutions provides a narrow measurable density range (dynamic range), and thus such conversion elements make it difficult to measure the whole density range of a negative or reversal film.

Therefore, in an image reading device for use in a digital photoprinter or the like, to set a density range which can be read by the photoelectric transducer, before a film image is read for printing, the image reading device performs a pre-reading operation (a prescanning), in which a film image is coarsely read while the measuring density area of the photoelectric transducer is set wide, thereby setting an image reading density range in an image reading operation (a main scanning) for output to a finished print.

In main scanning, the reading of a transmitted light by the photoelectric transducer is adjusted according to the set image reading density range, that is, an offset density is applied to the transmitted light reading by the photoelectric transducer to thereby adjust (reduce) the reading density range. In an offset density application method, the quantity of light of a reading light source can be adjusted (adjustment of a reading light), the quantity of light of the transmitted light can be adjusted, or the gain of an amplifier can be changed, and, if the photoelectric transducer is a CCD, then the storage time can be changed. That is, various methods are available.

It should be noted that a negative film and a reversal film differ greatly in image characteristics from each other. That is, an image recorded on a negative-film is not to be viewed directly but is printed on paper before it can be viewed normally. For this reason, the image is usually printed on printing paper by means of LATD (large area transmittance density). On the other hand, an image recorded on a reversal film is to be viewed directly.

The developing characteristics of the three primary colors, that is, R, G and B of the negative and reversal films, are respectively designed according to their respective uses. That is, the negative film is designed so that an image of higher quality can be obtained when it is printed on the printing paper, whereas the reversal film is designed so that the recorded image itself is of higher quality.

Therefore, if the same offset density is employed for both negative film and reversal film differing entirely in characteristics from each other in the main scanning (image reading), then color balance is lost or other problems are incurred. To achieve a highly accurate image reading operation to thereby obtain a finished print of higher image quality, different offset densities may be preferably applied according to the type of film, that is, according to whether the film is a negative film or a reversal film.

However, in the conventional method of reading transparent-type originals, when a reversal film is read, the only adjustment carried out is the insertion of a filter corresponding to the lowest image density (mask density) of the negative film in order to match the lowest image density of the reversal film to the negative film. Due to this, white balance is lost in the image reading, which results in a problem that the quality of the reproduced image is reduced.

SUMMARY OF THE INVENTION

In view of the above, it is desired to realize an image reading method which can perform an image reading operation with higher accuracy regardless of the type of film, that is, regardless of whether the film is a negative film or a reversal film, and thus can provide a reproduced image of higher quality and with white balance.

In view of the above circumstances, the present invention aims at eliminating the problems found in the above-mentioned conventional image reading method. Accordingly, it is an object of the invention to provide an image reading method which, in reading an image of a transparent-type original, by applying a proper offset density according to the type of recording media or film, that is, according to whether a negative film or a reversal film is used, can carry out a highly accurate image reading operation without incurring any loss of white balance and other such problems, and thus can obtain a reproduced image of higher quality having an excellent color balance and an excellent density balance.

In attaining the above object, according to the invention, there is provided an image reading method in which a reading light is radiated onto a transparent-type original, the transmitted light of the transparent-type original is separated into three primary colors and the three primary colors are read by a photoelectric transducer, characterized in that, when an image carried by the transparent-type original is read, an adjustment of reading of the transmitted light by the photoelectric device is made in accordance with the image density information of the transparent-type original; that is, if the transparent-type original is a negative film, then the reading adjustment of the transmitted light by the photoelectric device is made independently for the respective three primary colors and, if the transparent-type original is a reversal film, then the reading adjustment of the transmitted light by the photoelectric device is made uniformly for all of the three primary colors.

Also, in the above image reading method, it is preferable that the reading adjustment of the transmitted light by the photoelectric transducer be made by at least one of adjustments including the adjustment of the light quantity of reading light, the adjustment of the light quantity of the transmitted light, the adjustment of the photometric conditions of the photoelectric transducer, and the adjustment of the gain of an amplifier which amplifies the output of the photoelectric transducer.

An image reading method according to the invention is a method which reads a color image recorded on a transparent-type original such as a negative film, a reversal film and the like by use of an photoelectric transducer. In the present image reading method, when reading an image recorded on the negative film, in accordance with image density information previously obtained by prescanning or the like, reading adjustments respectively set so as to correspond to the three primary colors (for example, R, G and B) are made, that is, offset densities respectively set so as to correspond to the three primary colors are determined before image reading is carried out. On the other hand, when reading an image recorded on a reversal film, in accordance with the image density information of a reading image previously obtained, an offset density set uniformly for the three primary colors is determined before image reading is effected.

In general, a photoelectric transducer, whose spatial resolution and density (quantity of light) resolution are both higher, provides only a narrow measurable density range (dynamic range). In view of this, according to the invention, a reading density range is set by prescanning or the like and, in the main scanning, according to image reading density ranges, an offset density is applied by means of adjustment of the photometric conditions of the photoelectric transducer, such as adjustment of the light quantities of the reading and transmitted light beams, adjustment of the storage time of a CCD or the like, to thereby reduce the reading density range, so that image recording can be achieved at higher spatial and density resolutions.

An image recorded on the negative film is not to be viewed directly and is only viewed after it is printed on printing paper, whereas an image recorded on reversal film is viewed directly. Therefore, the photosensitive materials for the negative film and reversal film are selected according to their respective uses, and thus the negative and reversal films have entirely different characteristics from each other.

If similar offset densities were applied when reading negative film and reversal film, then the color balance of the read image would be lost or other problems incurred, that is, the image reading accuracy would be lowered. In order to realize image reading with higher accuracy, it is preferable to set different offset densities when reading images on negative film and reversal film.

However, in the conventional image reading method, in order for the lowest image density to be matched to a negative film when reading a reversal film, the only adjustment made is the insertion of a filter corresponding to the lowest image density of negative film. For this reason, the conventional image reading method has not realized a higher quality image reading with good color balance and the like.

On the other hand, in the image reading method of the invention, according to the image density information of a film image previously obtained by prescanning or the like, when reading an image in a negative film, individual or different offset densities are applied to the respective three primary colors before the image is read, whereas when reading an image in a reversal film, a uniform offset density is applied to each of the three primary colors before the image is read.

As is known well, an image recorded on a negative film is printed on printing paper according to LATD and, for this reason, the image recorded on the negative film need not have a good color balance. Accordingly, in the negative film, the photosensitive layers of the respective primary colors R, G and B are designed so that the color developing densities of the respective colors R, G and B with respect to exposure can be moved in parallel to one another.

On the other hand, an image recorded on reversal film is to be viewed directly and, therefore, the image needs to have a good color density balance. That is, if achromatic light strikes a spot on a reversal film, the spot needs to be developed in grey. For this reason, in the reversal film, in order that grey can be reproduced in a good manner in every area of the reversal film, the photosensitive layers of the respective primary colors R, G and B are designed such that the ratios of the respective color developing densities of the primary colors R, G and B with respect to exposure are always constant.

Accordingly, in the image reading method of the invention which, when reading an image recorded on a negative film in which the respective color developing densities of the primary colors R, G and B are moved in parallel, applies offset densities respectively corresponding to the primary colors R, G and B before the image is read, and, when reading an image on a reversal film in which the ratios of the respective color developing densities of the primary colors R, G and B are always constant, applies a uniform offset density to all of R, G and B before the image is read, image reading with higher accuracy can be achieved without losing the color balance of the image recorded on a film regardless of whether the film is a negative film or a reversal film, thereby providing an output image of higher quality having an excellent color balance and an excellent density balance.

BRIEF DESCRIPTION OF THE DRAWINGS

FIG. 1 is a conceptual view and a block diagram of an example of a digital photoprinter which operates in accordance with an image reading method of the invention;

FIGS. 2(a) and 2(b) are conceptual views and block diagrams illustrating setting an offset density in an image reading method according to the invention, in which FIG. 2(a) illustrates setting an offset density when reading an image recorded on a negative film and FIG. 2(b) setting an offset density when reading an image in a reversal film;

FIG. 4 is a conceptual view and block diagram of an image forming unit of the digital photoprinter shown in FIG. 1.

DESCRIPTION OF THE PREFERRED EMBODIMENTS

Figure 3A:
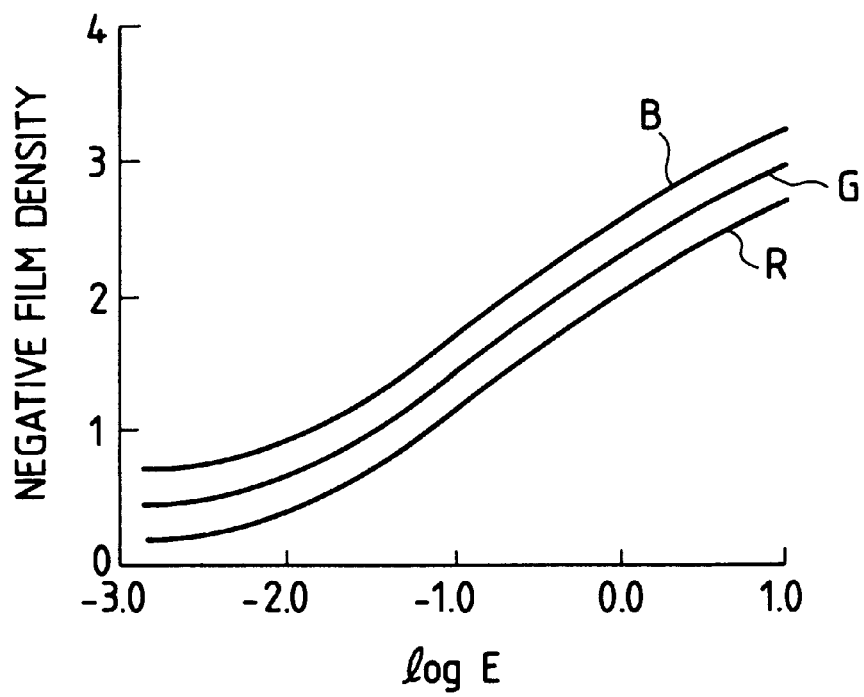
FIGS. 3(a) and 3(b) are graphical representations of a developing density, of which FIG. 3(a) relates to developing density in a negative film, and FIG. 3(b) developing density in a reversal film.

A description will be given hereinbelow in detail of an image reading method according to the invention by way of preferred embodiments thereof shown in the accompanying drawings.

In FIG. 1, there is conceptually shown an embodiment of a digital photoprinter operating in accordance with an image reading method of the invention. In FIG. 1, the flow of image information is shown by a solid line, the flow of control signals is shown by a broken line, and light is indicated by a one-dot chained line.

In FIG. 1, there is shown a digital photoprinter 10 which reads transmission images sequentially frame by frame, which images are recorded on a developed negative or reversal film of 24 frames, 36 frames or the like, and which performs required image processing operations on the read images, and then carries out a set-up operation to produce full color print images (output images) from the read images, records the print images on a photosensitive material A by means of scanning and exposure, develops the images and then outputs a finished print P. The digital photoprinter 10 includes as basic elements an image reading device 12 which reads sequentially transmission images recorded on a developed (roll) film F to thereby carry out the image reading method of the invention, a set-up device 14 displays simulated images of the read images and examines the quality of the images to thereby determine image forming conditions (that is, set-up conditions), and an image forming device 16 which scans and exposes the photosensitive material A according to the image forming conditions set by the set-up device 14 and develops the exposed photosensitive material A to thereby produce a finished print.

In FIG. 1, the image reading device 12 used to carry out an image reading method according to the invention basically includes a prescanning (previous reading) unit 18, a main scanning (normal reading) unit 20, a prescanning operation memory unit 22, a read control unit 24, an input timing control unit 26, an amplifier 28, an A/D converter 30, a CCD correction unit 32, a density converter 34, and a scaling unit 36.

The image reading device 12, while feeding a developed (roll) film F in a direction of an arrow a in FIG. 1, separates an image recorded on the film F frame by frame, for example, into three primary colors R (red), G (green) and B (blue), reads them photoelectrically as an R image, a G image and a B image, respectively, performs various image processing operations such as an A/D conversion, correction of measurement values, density change, scaling, sharpness and the like on the image information of the respective colors that are read, and sends the image information to the set-up device 14.

In the illustrated embodiment of the image reading device 12, the prescanning unit 18 and a main scanning unit 20 are disposed independently of each other. At first, in the prescanning unit 18, the image recorded on the film F is coarsely read to obtain the outline of the image. Next, according to the results of the prescanning executed by the prescanning unit 18, reading conditions in the main scanning unit 20 including the read density range of image reading, a reading adjustment corresponding to the read density range, that is, an offset density and the like are set, and, subsequently, in the main scanning 20, the image of the film F is read at a higher spatial resolution and at a higher density resolution.

The prescanning unit 18 includes a prescanning light source 38, and image forming lens 44, and a prescanning line CCD (which is referred to as a prescanning CCD 46), and further includes a pair of feed rollers (not shown) which are used to feed the film F at a given speed.

The light source 38 emits a pre-reading light beam for prescanning the image of the film F. For the light source 38, there are available various light sources which are used for normal image reading, such as a halogen lamp, a fluorescent lamp and the like, provided that it is able to emit a sufficient quantity of light for reading by the prescanning CCD 46.

While the film F is being held between a pair of feed rollers (not shown) or the like in other areas than the image area and is being fed at a given feed speed in a scan feed direction shown by an arrow a, the entire surface of the film F is radiated by the pre-reading light beam emitted by the light source 38.

The transmitted light that has passed through the film F (specifically, an image recorded on the film F) forms an image on the prescanning CCD 46.

The prescanning CCD 46, which is composed of three CCD line sensors respectively corresponding to the three primary colors R, G and B, is arranged such that it separates the transmitted light into the three primary colors R, G and B, converts them photoelectrically, and reads them as the respective image information of the three primary colors R, G and B.

In the illustrated image reading device 12, the prescanning operation by the prescanning unit 18 is executed mainly for setting an image reading density range (hereinafter referred to as a read density range).

Therefore, the measurement of the transmitted light by the prescanning CCD 46 need not have higher spatial resolution and density resolution, provided that it has a measuring density range (that is, dynamic range) which is able to measure the entire density range recorded on the film F.

The light quantity data that is prepared by the prescanning unit 18 is transferred to the prescanning operation memory unit 22.

The prescanning operation memory unit 22 operates on the image information transferred thereto to provide the image density information of the image and checks the image for the exposed condition thereof (whether the exposure is correctly exposed, underexposed, or overexposed) to thereby set a read density range in the main scanning operation. Also, the prescanning operation memory unit 22 sets an offset density for reduction of the read density range, which offset density is used to execute main scanning (image reading) in accordance with the read density range set in the main scanning unit 20.

Since the illustrated image reading device 12 is used to carry out the image reading method of the invention, if the film F is a negative film, then it applies independent offset densities for reading the three primary colors R, G and B in the main scanning unit 20 and, if the film F is a reversal film, then it applies the same offset density for reading R, G and B in the main scanning unit 20.

In FIGS. 2(*a*) and 2(*b*), there is conceptually shown an image reading method according to the invention which executes the above-mentioned offset density setting. FIG. 2(*a*) relates to the reading of the negative film and FIG. 2(*b*) to the reading of the reversal film.

The light quantity data of the three primary colors R, G and B read by the prescanning CCD 46 are transferred to a reference density calculation 22*a* of the prescanning operation memory unit 22.

The reference density calculation section 22*a* converts the light quantity data of R, G and B into their respective pieces of image density information, forms histograms of pixel image densities relating to the respective pieces of image information, and sets reference densities respectively relating to R, G and B.

There is no special limit to the method of setting the reference densities but, as the reference densities, for example, there can be used the lowest image density, maximum image density, average image density, intermediate image density, image density that indicates the specific frequency of an accumulative density histogram, and the like.

The respective reference densities of the three primary colors R, G and B set by the reference density calculation unit 22*a* are then transferred to an offset setting section 22*b*.

The offset setting section 22*b* sets read density ranges in the main scanning operation according to the reference densities transferred thereto, sets offset densities to be applied to the image reading by the main scanning unit 20 according to the thus-set read density ranges, and then transfers the offset densities to the main scanning unit 20 (which will be described later, in particular, the read control unit 24 and input timing control unit 26).

When illustrated image reading device 12 is used to carry out the image reading method of the invention, if the film F is a negative film, as shown in FIG. 2(*a*), in accordance with the respective reference densities of the three primary colors R, G and B, there are calculated an R offset for R image reading, a G offset for G image reading and a B offset for B image reading respectively, and the different offset densities for the respective primary colors are applied to the main scanning unit 20.

On the other hand, if the film F is a reversal film, as shown in FIG. 2(*b*), in accordance with the respective reference densities of the three primary colors R, G and B, there is calculated an offset density which corresponds to all of R image reading, G image reading and B image reading, and an offset density common to all of the three color readings is applied to the main scanning unit 20.

An image recorded on the negative film is not to be viewed directly but it must be printed on printing paper before it is viewed. For this reason, it is not necessary that the image recorded on the negative film have good color balance, but the respective photosensitive layers of the three primary colors R, G and B are respectively designed in such a manner that the image can be of higher quality when it is printed on the printing paper.

That is, since the image recorded on the negative film is normally printed on the printing paper according to LATD, in the negative film, as shown in FIG. 3(*a*), the respective photosensitive layers of the three primary color are designed such that the respective color developing densities of the three primary colors R, G and B with respect to exposure (log E) are moved in parallel.

On the other hand, an image recorded on a reversal film is to be viewed directly and, therefore it is necessary that the image recorded on the reversal film itself be a higher quality image having a good color balance and a good density balance. That is, when achromatic light strikes the image, then the incident light spot of the image must develop in grey.

Figure 3B:
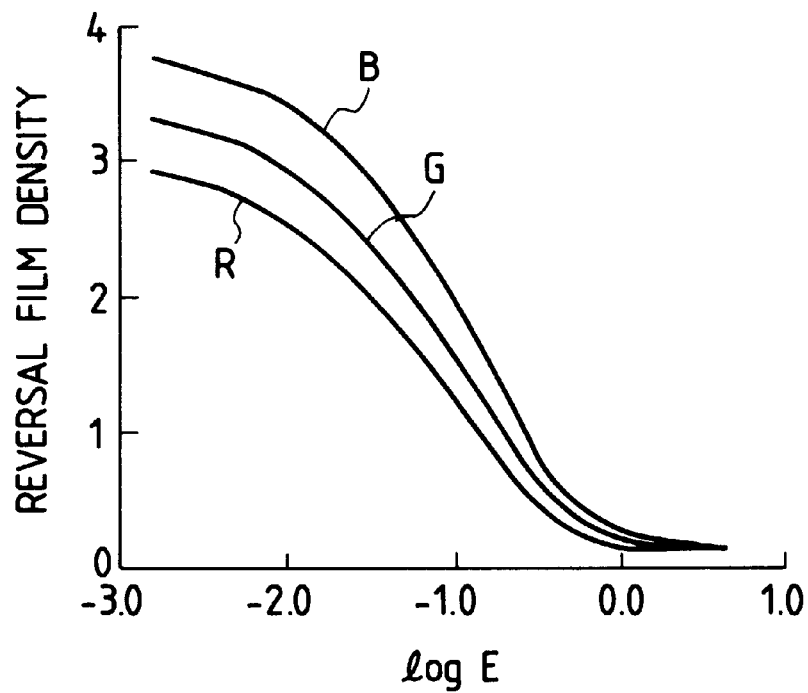

Therefore, in order for grey to be reproduced well in every area thereof, in the reversal film, as shown in FIG. 3(b), the respective photosensitive layers of the three primary colors are designed such that the ratios of the color developing densities of the three primary colors R, G and B with respect to exposure are always equal to one another.

Thus, if the same offset density is applied in both cases when the negative film and reversal film are read, then the color balance and the like of the image read will be lost and, therefore, it is preferable that offset densities corresponding to the respective cases be applied. However, in the conventional image reading method, in order to match the lowest image density to the negative film when reading the image recorded on the reversal film, the only adjustment is the insertion of a filter equivalent to the lowest image density of the negative film. That is, as described above, the reading of a higher quality image having a good color balance and the like cannot be realized.

On the other hand, according to the image reading method of the invention, when reading an image recorded on negative film in which the respective color developing densities of the three primary colors R, G and B are moved in parallel to one another, offset densities differing in the respective three primary colors R, G and B are applied to the main scanning unit 20, whereas when reading an image recorded on reversal film in which the ratios of the respective color developing densities of the three primary colors R, G and B are always constant, an offset density common to all of the primary colors R, G and B is applied to the main scanning unit 20.

As a result, in reading an image recorded on either of negative film or reversal film, the read image is an image of higher quality in which color balance is not lost. That is, with the use of the image reading method of the invention, it is possible to obtain a higher quality output image (a finished print P) which has good color balance.

There is no specific limit to the offset density setting method, and various types of known methods can be used.

For example, in reading negative film, there can be used a method in which the lowest image densities of the respective image densities of the three primary colors R, G and B and obtained by prescanning are used as offset densities for reading the images of the respective primary colors. On the other hand, in reading reversal film, there can be employed a method in which the average image density of all of the image densities of the three primary colors R, G and B are used as an offset density common with all of the three primary colors.

In the image reading device 12, whether the film F is a negative film or a reversal film may be checked by prescanning automatically or may be checked manually. Also, if the developing device of the film F and the digital photoprinter 10 (image reading device 12) are connected with each other, then whether the film F is a negative film or a reversal film may be checked by the developing device.

The offset density (i.e., signal representing the offset density) set in the prescanning operation memory unit 22 is sent to the read control unit 24 and input timing control unit 26.

The read control unit 24 is used to adjust and control the amounts of insertion of filters (the light quantities to be adjusted by the respective filters) in a filter unit 52 to adjust the quantity of the reading light of the main scanning unit 20. That is, the read control unit 24 adjusts the amounts of insertion of color filters, namely, a C (cyan) filter, an M (magenta) filter and a Y (yellow) filter according to the offset densities set in the prescanning operation memory unit 22.

On the other hand, the input timing control unit 26, on receiving signals from the prescanning operation memory unit 22, controls a storage time by the main scanning line CCD 64, and controls the process timings of the image information to be performed by the main scanning line CCD 64, A/D converter 30, CCD correction unit 32 and a timing selector 88 of the set-up device 14.

The storage time by the main scanning line CCD 64 is controlled by the input timing control unit 26 according to the offset density set in the prescanning operation memory unit 22.

In other words, in the illustrated embodiment of the image reading device 12, the offset density in main scanning is set by adjusting the quantity of the reading light and the storage time of the main scanning line CCD 64 in the filter section 52 of the main scanning unit 20.

The main scanning unit 20 is used to carry out image reading for output (recording into the finished print P) and, in particular, the main scanning unit 20 reads the prescanned image photoelectrically at higher spatial resolution (for example, in the case of a 35-mm film, on the order of 1,100 pixels by 1,700 lines) and at higher density resolution, and then transfers the read image as output image information to the amplifier 28.

The main scanning unit 20 includes a main scanning light source 50, a filter section 52, a condensing section 54, a pair of feed rollers 56, an image forming lens 60, and a main scanning line CCD 64 (hereinafter referred to as main scanning CCD 64).

The light source 50 is used to emit reading light for reading the image of the film F. As the light source 50, any of various light sources for use in normal image reading such as a halogen lamp, a fluorescent lamp or the like can be used, provided that it is able to emit a sufficient quantity of light for reading by the main scanning CCD 64.

The reading light emitted by the light source 50 then enters the filter section 52.

The filter unit 52 cuts off unnecessary components such as infrared rays, ultraviolet rays and the like from the reading light, and also adjusts the quantity and color tone of the reading light according to the exposure conditions of the image to-be read. The filter unit 52 includes a filter 52N which is a combination of an infrared blocking filter, an ultraviolet absorbing filter and the like, and three primary color filters such as a cyan filter 52C, a magenta filter 52M and a yellow filter 52Y.

Each of the cyan filter 52C, magenta filter 52M and yellow filter 52Y is formed by a combination of a color filter and a stop, and an amount of insertion (that is, a stop setting) of each filter in a reading light path is controlled by the above-mentioned read control unit 24 according to the offset density of the main scanning.

In the image reading device 12 according to the invention, when reading negative film, different offset densities are applied for the respective colors R, G and B, whereas when reading reversal film, a common offset density is applied for all of the colors R, G and B. For this reason, if the film F is a negative film, then the amounts of insertion of the respective color filters into the reading light path are basically different from one another and, on the other hand, if the film F is a reversal film, then the amounts of insertion of the respective color filters are the same.

After the reading light has passed through the filter unit 52 and has been adjusted in the quantity thereof according to the offset density, the reading light enters the condensing unit 54.

The condensing unit 54 diffuses and condenses the incident reading light therein, and emits the condensed light from an opening 54a thereof as a slit-like reading light beam having a longitudinal direction substantially perpendicularly intersecting a scanning direction (a direction of an arrow a shown in FIG. 1), so that the slit-like reading light can enter the film F.

It goes without saying that the longitudinal direction of the slit-like reading light emitted from the condensing unit 54 is longer than the width direction of the film F.

The pair of feed rollers 56 conveys the film F to other locations than the image area, and feeds the film F in a scanning and feeding direction shown by the arrow a at a given feeding speed according to, for example, the clock rate (storage time) of the main scanning CCD 64, for example, if the film F is a 35-mm film, then at such a given feeding speed that 1,700 lines can be read. Also, a drive source such as a motor (not shown) or the like is engaged with the pair of feed rollers 56.

As described above, since the reading light is a slit-like beam having a longitudinal direction almost perpendicularly intersecting the scanning direction thereof, the entire surface of the film F (including the image recorded thereon) to be fed in the scanning direction will be scanned in a two-dimensional manner by the reading light beam.

Although not shown for simplification of the drawings, in the image reading device 12, in addition to the pair of feed rollers 56, there are provided other various members used to realize the stable scanning and feeding of the film F, such as a pair of rollers, guide members and the like movable in synchronization with the pair of feeding rollers 56.

Also, the scanning and feeding device of the film F, besides the pair of feed rollers 56, can also use various known methods using a long and narrow feeding member such as a feeding method using belts, a feeding method using sprockets and the like, provided that it allows the reading light to pass through the film F.

The slit-like transmitted light beam that has passed through the film F then is made to form an image on the light receiving surface of the main scanning CCD 64 by an image forming lens 62, and the quantity of light of the transmitted light is then measured.

The main scanning CCD 64 is composed of three types of CCD line sensors respectively corresponding to the three primary colors R, G and B. Accordingly, the main scanning CCD 64 separates the transmitted light carrying the recorded images that has passed through the film F into, for example, the three primary colors R, G and B, and converts photoelectrically and measures the respective light quantities of the respective primary colors R, G and B, thereby being able to read the images recorded on the film F in the read density range (light quantity range) which is set in the above-mentioned manner.

In the illustrated embodiment, for example, if the film F is a 35-mm film, then one line (that is, the longitudinal direction of the slit-like transmitted light) is read with a resolution of 1,100 pixels. For this reason, in the illustrated embodiment of the image reading device 12, in the case of images recorded on the 35-mm film, the images can be read at a higher spatial resolution of 1,100 pixels by 1,700 lines.

Also, in the main scanning CCD 64, when compared with the prescanning CCD 46, it is necessary to enhance the density resolution and, in order to obtain a finished print of adjusting the gain of a photomultlplier or the like (if such a device is used) as an photoelectric transducer, and the like.

Also, the invention is not limited to the illustrated embodiment which uses two methods in combination but, alternatively, the offset density can be applied by only one method, or the offset density can be applied by three or more methods.

In the illustrated image reading device 12, both the prescanning unit 18 and main scanning unit 20 use the line CCD as the photoelectric transducer. However, the invention is not limited to this case, for example, an area CCD can also be used.

Besides the CCD, there can also be used another various known photoelectric transducers such as a photomultiplier and the like.

Further, in the main scanning unit 20 and prescanning unit 18 of the illustrated embodiment, the image recorded on the film F is read by slit scanning. However, the invention is not limited to this but, of course, there can also be used other scanning means such as a flying spot scanner (FSS), a light beam scanner (a so-called raster scanner) and the like.

The respective pieces of image information of the three primary colors R, G and B of the image of the film F read by the main scanning CCD 64 (which are hereinafter referred to P of higher quality, it is preferable to obtain a resolution having a density D (=log E) of the order of 0.01.

The storage times of the respective line CCDs of the three primary colors R, G and B of the main scanning CCD 64 are controlled by the input timing control unit 26 according to the offset density of the main scanning. Therefore, the image reading device 12 according to the invention, when reading negative film, applies different offset densities to the respective primary colors R, G and B and, when reading reversal film, applies a common offset density to all of the three primary colors R, G and B. Accordingly, if the film F is a negative film, then the storage times of the respective line CCDs are basically different from one another and, if the film F is a reversal film, then the storage times of the respective line CCDs are equal to one another.

In the illustrated image reading device 12, the offset density for main scanning (image reading) is applied by adjusting the light quantity of the reading light and the storage time of the main scanning CCD 64. However, the offset density adjusting method according to the invention is not limited to this, but other methods can also be used conveniently which include a method of adjusting the gain of the amplifier 28 (which will be described later), a method of arranging a stop and a color filter in the image forming lens 62 to adjust the quantity of the transmitted light, a method as image information) are amplified by the amplifier 28 and are then converted into digital signals by the A/D converter 30.

The image information is then corrected by the CCD correction unit 32 in such a manner that errors (variations) of the respective pixels of the main scanning CCD 64 and variations of dark current and dark attenuation are corrected, then is processed by the scaling unit 36 in such a manner that the scale thereof is changed and the sharpness thereof is emphasized (unsharp mask). The corrected and processed information is then transferred to the set-up device 14.

The set-up device 14 examines the quality of the image information transferred thereto from the image reading device 12, performs color/gradation correction as required, and transfers the image information for output (print) to the image forming device 16. The set-up device 14 includes a first selector 70, three frame memories (FM) 72a, 72b and 72c, a second selector 74, a set-up operation memory unit 76, a color gradation correction display control unit 78 (hereinafter referred to as display control unit 78), a display 80, an input unit 82, a color correction unit 84, a gradation correction unit 86, a timing selector 88, and an output timing control unit 90.

The image information from the scaling unit 36 is firstly transferred to the first selector 70.

The first selector 70 distributes the image information of the respective frames of the film F to three frame memories 72a, 72b and 72c sequentially. That is, for example, at first, the first selector 70 connects its transfer path so that the image information of the first frame can be stored in the frame memory 72a. On completion of storage into the frame memory 72a, the first selector 70 switches its transfer path so that the image information of the second frame can be stored in the frame memory 72b.

On the other hand, when the image information of the first frame is stored in the frame memory 72a, then the second selector 74 connects the set-up operation memory unit 76 with the display control unit 78.

The set-up operation memory unit 76 operates the optimum image processing conditions (set-up conditions) with respect to the image in accordance with the prescanning image information transferred from the prescanning operation memory unit 22 and also with the image information read from the frame memory 72a, and controls the display control unit 78 in accordance with the results of these operations.

The display control unit 78, in accordance with the image information read from the frame memory 72a and an instruction signal from the set-up operation memory unit 76, displays on the display 80 a simulated image which corresponds to a finished print in the present condition.

An operator views the image displayed on the display 80 and examines the quality of the image and, if the image is satisfactory, then the operator presses the start key of the input unit 82 and, if the image is unsatisfactory, then the operator presses a correction key. In other words, the operator inputs the instruction of the color and/or gradation correction to the input unit 82 by means of a color correction key and a gradation correction key.

The set-up operation memory unit 76 controls the display control unit 78 in accordance with the instruction of the color and/or gradation correction input thereto, and the display control unit 78 displays again the simulated image on the display 80 in accordance with the control by the set-up operation memory unit 76. This operation is performed repeatedly until the quality of the image displayed on the display 80 is satisfactory.

As a result of the above operations, if the quality examination results in a satisfactory image and the start key of the input unit 82 is pressed, then the set-up operation memory section 76 transfers a color correction signal and a gradation correction signal corresponding to the determined set-up conditions to the color correction section 84 and gradation correction unit 86.

At the same time, the second selector 74 connects the frame memory 72a with the color correction unit 84, and thus the image information read out from the frame memory 72a is corrected in the color/gradation thereof according to the set-up conditions by the color correction unit 84 and gradation correction unit 86, whereupon the color/gradation corrected image information is transferred to the image forming device 12.

Also, the second selector 74 connects the frame memory 72b with the set-up operation memory unit 76 and display control unit 78 simultaneously, so that the image stored in the frame memory 72b is examined in quality similarly.

The outputs from the set-up operation memory unit 76, display control unit 78, color correction unit 84, gradation correction unit 86 and other units of the set-up device 14, the outputs from a D/A converter 92, an AOM driver 94 and the like provided in the image forming device 16, and the driving of a polygonal mirror 96 are respectively controlled by an output timing control unit 90.

The illustrated set-up device 14 includes three frame memories 72a, 72b and 72c. However, the number of the frame memories is not limited to three, and the set-up device 14, alternatively, may include one or two frame memories or four or more frame memories.

The illustrated digital photoprinter 10 includes the image reading device 12, set-up device 14 and image forming device 16 and, therefore in consideration of the processing efficiency and cost of the digital photoprinter 10, it is considered that, as the number of frame memories, three is best in balance as in the illustrated embodiment.

The image forming device 16 scans and exposes the photosensitive material A by light beam scanning according to the image information transferred from the set-up device 14, develops the exposed photosensitive material A, and outputs the developed image information as a finished print P. The image forming device 16 includes a D/A converter 92, an AOM driver 94, an image exposure unit 98 and a developing unit 100.

The image information output from the set-up device 14 is converted into analog image information by the D/A converter 92 and is then transferred to the AOM driver 94.

The AOM driver 94 drives an acoustic optical modulator (AOM) 104 so that the optical beam is modulated according to the image information transferred to the AOM driver 94.

On the other hand, the image exposure unit 98 is used to scan and expose the photosensitive material A by means of light beam scanning (raster scanning) to thereby record the image of the image information in the photosensitive material A. As conceptually shown in FIG. 4, the image exposure unit 98 includes a light source 102R to emit a-light beam having a narrow wavelength corresponding to the exposure of an R photosensitive layer to be formed in the photosensitive material A, a light source 102G to emit a light beam corresponding to the exposure of a G photosensitive layer, a light source 102B to emit a light beam corresponding to the exposure of a B photosensitive layer, AOMs 104R, 104G and 104B respectively to modulate the light beams respectively emitted by the respective light sources according to the recorded image, a polygonal mirror serving as a light deflector, an fe lens 106, and a sub-scanning and feeding unit 108 for the photosensitive material A.

The respective light beams emitted by the light sources 102 (102R, 102G, 102B) and moved at different angles from one another enter AOMs 104 (104R, 104G, 104B). As the light source 102, there can be used various light beam sources which emit a light beam of a given wavelength corresponding to the photosensitive layer of the photosensitive material A, for example, various semiconductor lasers, LEDs, and gas lasers such as He-Ne laser and the like can be used. Also, there is available a combined wave optical system which combines together the wavelengths of the light beams.

The respective AOMs 104, to which the drive signals r, g and b of R, G and B respectively corresponding to the recorded image are transferred from the AOM drivers 94, modulates the intensities of the light beams incident thereon according to the recorded image.

The respective light beams modulated by the AOMs 104 enter substantially the same point of the polygonal mirror 96 serving as a light deflector and are reflected, deflected in a main scanning direction (in the direction of an arrow x shown in FIG. 4), next adjusted by the fθ lens 104 in such a manner that they are image formed at a given scan position z in a given beam shape, and then directed onto the photosensitive material A.

The light deflector is not limited to the illustrated polygonal mirror but a resonant scanner, a galvanometer mirror or the like can also be used. Also, of course, as the need demands, the image exposure unit 98 may include light beam shaping device and a surface falling correction optical system.

The photosensitive material A is wound in a roll-like manner and is loaded in a given position, while it is shielded from the light.

The photosensitive material A is drawn out by a device such as a drawing roller or the like, cut to a given length by a cutter (not shown), and then, while the photosensitive material A is held at the scan position z by a pair of rollers 108a and 108b forming a sub-scanning device and arranged with the scan position z between them, the photosensitive material A is sub-scanned and fed in a sub-scanning direction (the direction of an arrow y shown in FIG. 4) substantially perpendicularly intersecting the above-mentioned scanning direction.

As described above, since the light beams are deflected in the main scanning direction, the whole surface of the photosensitive material A being fed in the sub-scanning direction is scanned in a two-dimensional manner, and thus the image of the image information transferred from the set-up device 14 is recorded on the photosensitive material A.

After being exposed, the photosensitive material A is then fed to a developing unit 100 by a pair of feed rollers 110, where the photosensitive material A is developed to produce a finished print R.

For example, if the photosensitive material A is a silver salt photographic photosensitive material, then the developing unit 100 may be composed of a color developing vessel 112, a bleach-fix vessel 114, washing vessels 116a, 116b and 116c, a drying section 118 and the like, and the photosensitive material A is processed in the respective processing vessels and then output as a finished print R.

Figure 5:
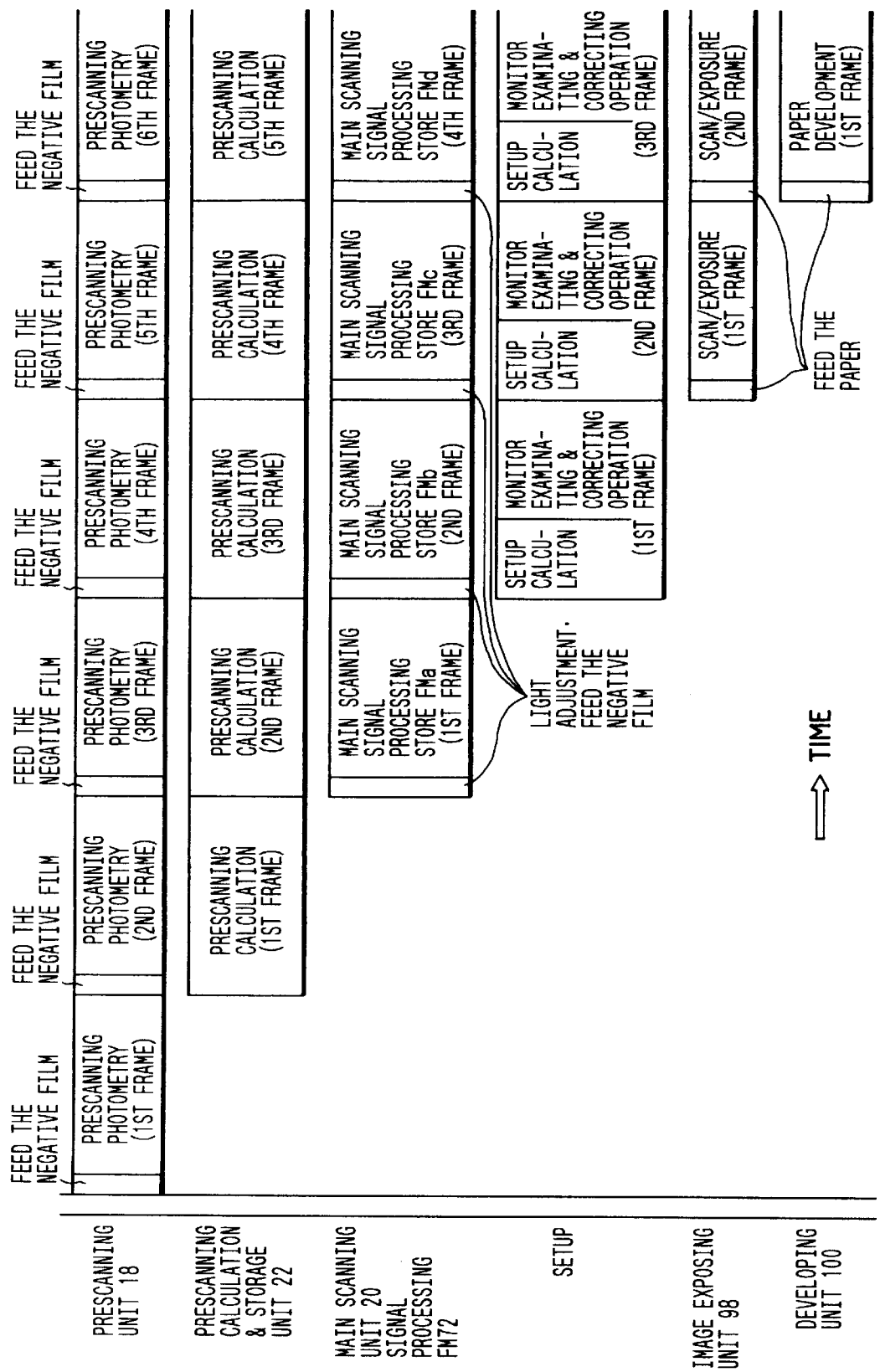
FIG. 5 is a timing chart of the operation timing of the digital photoprinter shown in FIG. 1.

The operational timing of the digital photoprinter 10 described above is conceptually shown in FIG. 5.

In the illustrated embodiment, there is employed a structure in which the light beam is modulated by the AOMs 104. Alternatively, however, the light beam can also be modulated by other light sources such as an LD and the like according to recorded images, provided that the light sources are able to modulate the light beam directly.

Also, the sub-scanning and feeding device can be formed by other members than the two pairs of rollers disposed with the scan position between them. For example, the sub-scanning and feeding device can be formed by two nip rollers disposed opposed to an exposure drum holding the photosensitive material at the scan position with the scan position between them.

Further, although in the illustrated embodiment light beam scanning is used, alternatively, it is also possible to use a so-called drum scanner which winds a photosensitive material round a drum, allows a light beam to enter at one spot, and rotates and moves the drum in the axial direction thereof.

Also, the invention is not limited to light beam scanning, and other scanning methods can be used: for example, a surface exposure method using a surface light source and a liquid crystal shutter, an exposure method using a linear light source such as an LED array or the like, or a method in which an image is not output to a photosensitive material but to a display such as a CRT or the like.

Although a preferred embodiment of an image reading method according to the invention has herein been described, the invention is not limited to the illustrated embodiment, of course, and various modifications and changes are possible within the scope and spirit of the invention.

As has been described hereinbefore in detail, in the image reading method of the invention, according to the type of the original, in particular, according to whether a film is a negative film or a reversal film, proper offset densities are applied when reading an image, whereby it is possible to achieve image reading with higher accuracy without incurring any loss of color balance regardless of the type of recording media. Thus, it is possible to obtain a reproduced image of higher quality having excellent color balance and density balance.

What is claimed is:

1. An image reading method in which a reading light is irradiated on a transparent-type original, the light transmitted through the original is separated into three primary colors, and the separated light in the three primary colors is read by means of a photoelectric transducer device, thereby reading an image carried by the transparent-type original, the improvement comprising the steps of: determining whether said original is a negative film or a reversal film in accordance with image density information of said original, if said transparent-type original is a negative film, adjusting said reading of said transmitted light by said photoelectric transducer device in said three primary colors independently of one another, and, if said transparent-type original is a reversal film, adjusting said reading of said transmitted light by said photoelectric transducer uniformly for said three primary colors, wherein the spectral characteristics of the transmitted light are the same for negative and reversal film, and wherein the adjustment of said reading of said transmitted light by said photoelectric transducer device comprises adjusting a light quantity of said reading light by adjusting photometric conditions of said photoelectric transducer device.

2. An image reading method in which a reading light is irradiated on a transparent-type original, the light transmitted through the original is separated into three primary colors, and the separated light in the three primary colors is read by means of a photoelectric transducer device, thereby reading an image carried by the transparent-type original, the improvement comprising the steps of: determining whether said original is a negative film or a reversal film in accordance with image density information of said original, if said transparent-type original is a negative film, adjusting said reading of said transmitted light by said photoelectric transducer device in said three primary colors independently of one another, and, if said transparent-type original is a reversal film, adjusting said reading of said transmitted light by said photoelectric transducer uniformly for said three primary colors, wherein the spectral characteristics of the transmitted light are the same for negative and reversal film, wherein the adjustment of said reading of said transmitted light by said photoelectric transducer device comprises adjusting a light quantity of said reading light by the gain of an amplifier which amplifies the output of said photoelectric transducer device.

3. The image reading method in which a reading light is irradiated on a transparent-type original, the light transmitted through the original is separated into three primary colors, and the separated light in the three primary colors is read by means of a photoelectric transducer device, thereby reading an image carried by the transparent-type original, the improvement comprising the steps of: determining whether said original is a negative film or a reversal film in accordance with image density information of said original, if said transparent-type original is a negative film, adjusting said reading of said transmitted light by said photoelectric transducer device in said three primary colors independently of one another, and, if said transparent-type original is a reversal film, adjusting said reading of said transmitted light by said photoelectric transducer uniformly for said three primary colors, wherein the spectral characteristics of the transmitted light are the same for negative and reversal film, wherein the adjustment of said reading of said transmitted light by said photoelectric transducer device comprises adjusting the quantity of said transmitted light by adjusting photometric conditions of said photoelectric transducer device.

4. An image reading method in which a reading light is irradiated on a transparent-type original, the light transmitted through the original is separated into three primary colors and the separated light in the three primary colors is read by means of a photoelectric transducer device thereby reading an image carried by the transparent-type original, the improvement comprising the steps of: determining whether said original is a negative film or a reversal film in accordance with image density information of said original, if said transparent-type original is a negative film, adjusting said reading of said transmitted light by said photoelectric transducer device in said three primary colors independently of one another, and, if said transparent-type original is a reversal film, adjusting said reading of said transmitted light by said photoelectric transducer uniformly for said three primary colors, wherein the spectral characteristics of the transmitted light are the same for negative and reversal film, wherein the adjustment of said reading of said transmitted light by said photoelectric transducer device comprises adjusting the quantity of said transmitted light by adjusting the gain of an amplifier which amplifies the output of said photoelectric transducer device.

5. The image reading method as set forth in claims 1, 2, 3 or 4, wherein said adjustment of said reading of said transmitted light by said photoelectric transducer device comprises offset density correction.

6. The image reading method as set forth in claim 5, wherein said offset density correction comprises, in reading negative film, applying a lowest image density of the respective image densities of the three primary colors Red, Green and Blue as offset densities for reading the images of the respective primary colors.

7. The image reading method as set forth in claim 6, wherein said offset density correction comprises, in reading reversal film, applying an average image density of all of the image densities of the three primary colors Red, Green and Blue as an offset density common with all of the three primary colors.

8. An image reading method according to one of claims 1,2,3 or 4, further comprising a step of pre-scanning said original to obtain the image density information of said original.

\* \* \* \* \*